Dec. 4, 1951     D. C. JOHNSON ET AL     2,577,196
MOLD TREATING APPARATUS
Filed Nov. 16, 1949     2 SHEETS—SHEET 1
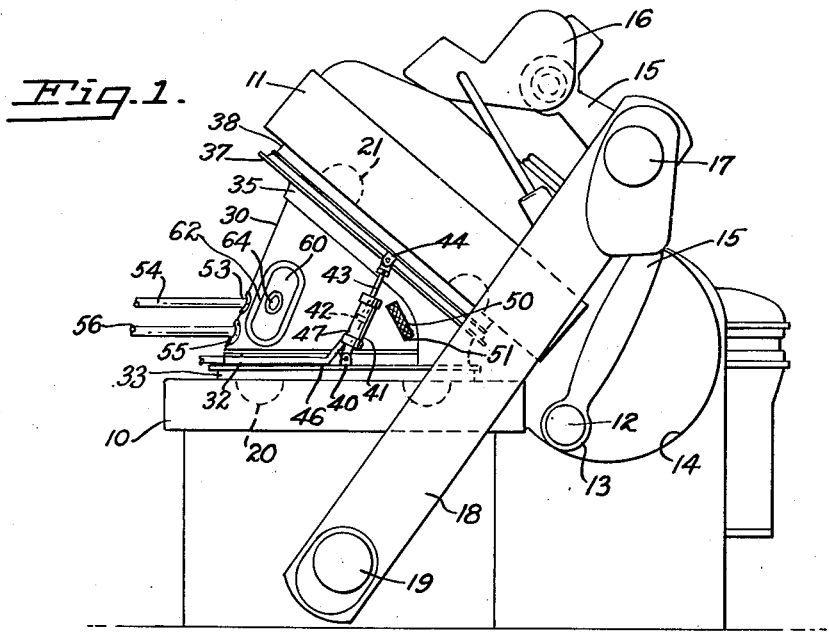
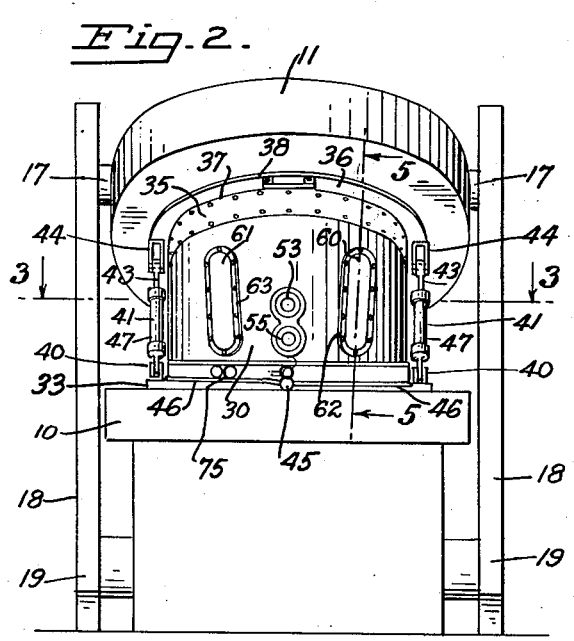
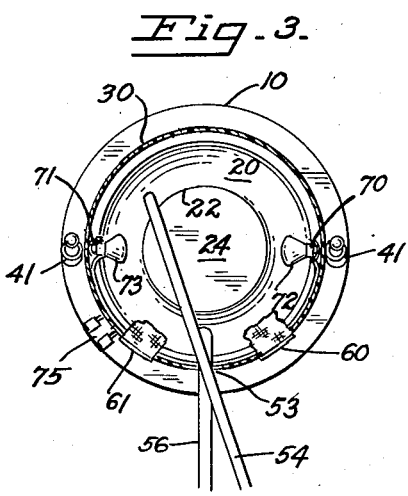
INVENTORS
DALE C. JOHNSON
HARRY L. WARNER
BY ARTHUR A. ZAMBRUNO
ATTORNEY

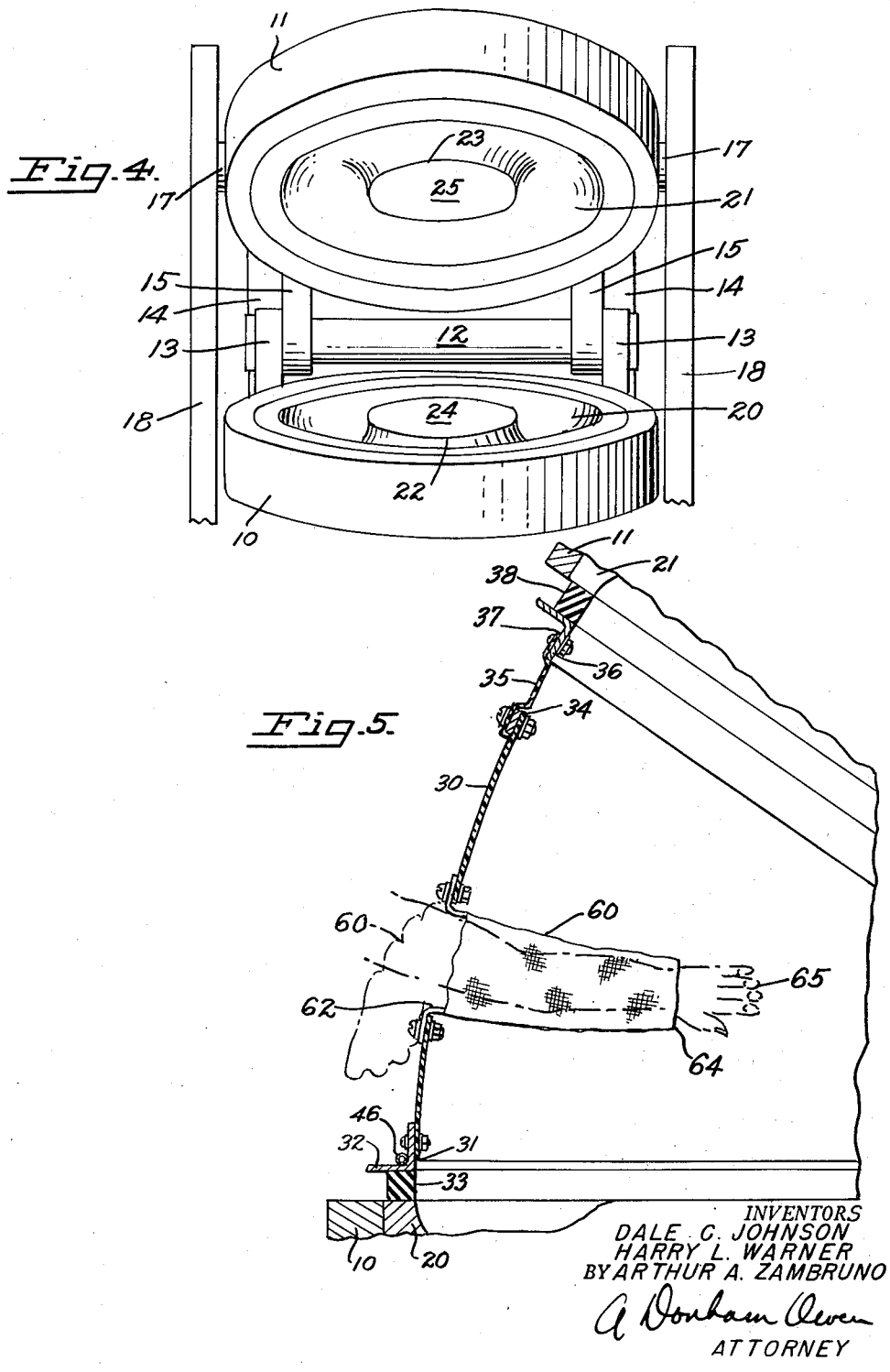

Patented Dec. 4, 1951

2,577,196

UNITED STATES PATENT OFFICE 2,577,196

MOLD TREATING APPARATUS

Dale C. Johnson, Concord, Harry L. Warner, Oakland, and Arthur A. Zambruno, San Mateo, Calif., assignors, by mesne assignments, to William H. Mead, Oakland, Calif.

Application November 16, 1949, Serial No. 127,734

19 Claims. (Cl. 51—8)

This invention relates to an apparatus for treating the interior surfaces of molds and similar equipment.

It solves problems in such industries as the rubber tire industry where heretofore there has been no satisfactory apparatus for cleaning tire molds. After every 500 tires or so the molds must be cleaned, in order to keep the intricate tread patterns free from obstructing matter. Heretofore the molds have either been cleaned slowly by hand, with the mold in place, or else the molds have had to be removed from their mounts, taken some distance away to a blast room and cleaned there. Tire molds are so large and heavy that their removal to a blast-cleaning room is an expensive and time-consuming operation. The waste and expended abrasive material cannot be allowed to spill out around the molds in the room where the tires are made, because if the abrasive gets into other molds it will cause defective tires.

The present invention solves these problems by providing an apparatus which can clean the tire molds in place without spilling any of the abrasive outside the molds and which will remove all the expended abrasive and waste from the molds. One mold can be cleaned while tires are being made in adjacent molds, without any danger that the cleaning operation will interfere with the tire making operation.

The structure of this invention includes a transparent window-shield which encircles and fills most of the space between the two halves of an opened mold. A gasket is provided around the lower edge of the shield. A flexible diaphragm-like strip is secured to the upper edge of the shield, and a gasket is provided on the upper edge of the diaphragm. The lower gasket rests on or adjacent to the lower mold half and hydraulic means are included to raise the diaphragm and to tighten the upper gasket against the upper mold half. The shield may be perforated to provide entrance openings for a blast hose through which the abrasive is impelled and for a suction hose through which the waste and spent abrasive material are removed. These hoses may be manually controlled and manipulated around inside the shield by the operator, because access holes are provided in the shield, with fabric sleeve-like arm-protecting means in these holes. There may also be lighting equipment inside the shield to illuminate the mold so that the operator may see clearly to do his work.

Other objects and advantages of the invention will appear from the following description of an illustrative embodiment thereof, given in accordance with United States Revised Statutes, Section 4888. This description is not intended to limit the invention narrowly, the scope of the invention being given in the appended claims.

In the drawings:

Fig. 1 is a view in side elevation of a tire mold and its supporting equipment, showing cleaning apparatus embodying the principles of the invention in place.

Fig. 2 is a view in front elevation of the equipment shown in Fig. 1, the blast and suction hoses being removed.

Fig. 3 is a plan view in section taken along the line 3—3 in Fig. 2, but showing the blast and suction lines.

Fig. 4 is a view similar to Fig. 2, showing the interior of the mold, with the shield removed, and the bottom portion omitted; and Fig. 5 is an enlarged view in elevation and in section of the cleaning device along the line 5—5 in Fig. 2; one of the access holes and its protecting arm shield is shown, the operator's arm being shown in dot-dash lines; in dotted lines the arm shield is shown hanging wrong side out outside the hole, as it will be when the operator takes his arm out.

The drawings illustrate a form of the invention used to clean rubber tire molds. However, it should be clearly understood that the apparatus is applicable to cleaning any other type of mold, where the mold sections are moved apart. The drawings and description are illustrative of the principles, but not co-extensive therewith.

The tire mold support comprises a base member 10 and upper member 11 pivotally secured to a shaft 12 at the rear. The shaft 12 includes cam wheels 13 which ride on a cam track 14. A bell crank 15 is pivoted at one end around the shaft 12, at its other end around a shaft held in a bracket 16 on top of the upper member 11, and in between around a center shaft 17. The shaft 17 is supported by one or more rigid arms 18 which are pivotally mounted at 19 on the lower member 10. A motor (not shown) is operable to move the cam rollers 13 on the track 14. To close the mold, the rollers will move to the right, thus pivoting the bell crank 15 around the center shaft 17 and forcing the lower member 11 down against the upper member 10. Movement of the rollers 13 to the left will open the mold, as shown in the drawings.

A lower mold half 20 is secured inside the base member 10, and an upper mold half 21 is similarly secured inside the upper support member 11. (See Fig. 4.) In most factory installations, both the supporting members 10 and 11 and the molds 20 and 21 are annular, with center openings 22 and 23 which provide access for air, steam, etc. Before the mold can be cleaned, the center openings 22 and 23 should be plugged with discs 24 and 25.

The cleaning apparatus of this invention is adapted to fit between the mold halves 20 and 21 when the mold is open. It includes a transparent window-shield 30 which may be constructed from light-weight, transparent plastic material so that the apparatus will be light in weight and can be carried from place to place, and so that there will be no danger of breakage while affording almost complete visibility at all times.

The window-shield 30 is generally cylindrical in shape, with its two open ends converging at the rear. It is termed "peripheral" in the claims because it fills the periphery between the mold sections. The rear end of the shield may not be transparent but may actually comprise part of the diaphragm 35 described below. Similarly the whole front part of the shield 30 need not be transparent either, so long as adequate transparent windows are provided.

Near the lower edge 31 of the window-shield 30 a metal rim 32 is attached. (See Fig. 5.) Preferably the rim 32 is a ring made from aluminum angle or L-bar, as shown in Fig. 5. An annular gasket or sealing member 33 is secured to the bottom of the rim 32. The gasket 33 will preferably be made from neoprene or soft rubber. It rests on top of the lower tire mold half 20 or on the press members 10 and 11 and effectually prevents the passage of abrasive between the mold half 20 and the window-shield 30.

A flexible diaphragm 35 is secured around the top edge 34 of the window-shield 30. The diaphragm 35 is preferably made of an abrasive-resistant material such as rubberized canvas. An aluminum angle rim 36 similar to the rim 32 is secured to the upper edge 37 of the rubber canvas strip 35, and an upper annular gasket 38 may be vulcanized or otherwise fastened to the rim 36. The diaphragm 35 permits adjustment for differences in the size of the gap between the mold halves 20 and 21 and ensures sealing of the gasket 38 which it supports. Normally it hangs limply, unless forced upwardly.

Hydraulic means are provided for forcing the gasket 38 up into place, the flexibility of the diaphragm 35 assuring a fit all around. (See Figs. 1 and 2.) A bracket 40 on each side of the lower rim member 32 pivotally supports an hydraulic cylinder 41. Each cylinder has a piston 42 whose connecting rod 43 is pivotally mounted at 44 to the upper rim 36. Compressed air may be introduced through a valve 45 and supply tubes 46 into the lower ends 47 of the cylinders 41 so as to raise the piston 42. When the connecting rods 43 are extended, they seat the upper gasket 38 firmly against its upper tire mold half 21. The flexible member 35 and the pivotal mountings 40 and 44 compensate for any differences in the size of opening between different tire molds, so that the seal will always be substantially complete. When the shield 30 is to be removed from the mold the valve 45 is operated to bleed from the lower end 47 of the cylinder 41; then the weight of the rim 36 will force back the piston 42 and the diaphragm 35 will collapse.

The window-shield 30 is perforated in several places in order to provide openings necessary to its functions. On one or both sides at the rear there may be an opening 50 covered by a wire screen 51 through which air may pass into the shielded area. (See Fig. 1.) The reason for this is that the suction current employed is generally greater than the blast current, so that air must be supplied inside the shield 30. The opening 50 is located where abrasive would not ordinarily be impelled and the screen 51 operates as an obstruction to prevent stray particles from passing out.

In the center at the front of the shield 30 there are two important openings through the window-shield 30; an upper opening 53 comprising a slip joint through which a blast hose 54 may be inserted, and a lower opening 55 comprising another slip joint where a suction hose 56 may be inserted. Slip joints are used so that the hoses 54 and 56 can be withdrawn when the device is being moved from mold to mold and so that the length of the hoses inside the shielded area may be varied easily.

The hoses 54 and 56 can be moved around inside the shield to project abrasive at or suck up abrasive from any portion of the mold halves 20 and 21. The means for manipulating these hoses includes a pair of flexible members 60 and 61 inserted around openings 62 and 63 one of which passes through each side of the shield 30. The members 60 and 61 may be made from such materials as rubberized canvas, and they are preferably made substantially oversize with an opening 64 through them. The operator may stick his hand 65 (preferably gloved) through the opening 64 in either of the members 60 or 61, pick up one of the hoses 54 or 56 and manipulate it around the molds. In this manner he may project abrasive into every crevice of the mold and may suck up the abrasive therefrom. When he removes his arm, it is preferable to turn the member 60, 61 inside out outside the arm holes 62, 63 so as not to leave it inside the shield 30. (See dotted lines in Fig. 5.) The openings 64 admit air into the shielded area, as do the openings 50, but they do not permit any abrasive to pass out therefrom, because the abrasive would have to follow a maze-like path to get out any of these openings, due to their location.

Inside the shield 30 there may be a pair of light sockets 70 and 71 mounted for universal turning, and light bulbs 72 and 73 may be inserted in these sockets. (See Fig. 3.) By this means any portion of the tire mold 20, 21 may be directly illuminated, so that the operator can observe its state clearly through the window 30. The sockets 70, 71 may be turned by inserting the hand through the members 60 and 61.

In operation the first step is to open the tire mold halves 20 and 21 apart and insert discs 24 and 25 to fill the open areas 22 and 23. The light-weight treating apparatus may be carried by its bottom rim 32, and the lower gasket 33 is placed carefully over the lower tire mold half 20, or on the rim of the base member 10. When the gasket 33 is properly positioned, air may be admitted to the lower half 47 of the cylinders 41 to raise the upper rim 36 against its tire mold half 21 or the rim of the upper press member 11. Then the blast hose 54 and suction hose 56 may be inserted through their slip joint openings 53 and 55. The lights 72, 73 may be turned on, and the suction and abrasive currents turned on. The light switch and the switches for the suction and blast currents are located on a small control panel 75.

Both the suction hose 56 and the blast hose 54 are manipulated by the operator inserting one of his arms in one of the arm holes passing his glove-protected hand through the openings 64 and grasping the desired hose with his hand 65. At all times he has a complete view of what is going on, and he may adjust the lights 72 and 73 so that he can see clearly how the work is proceeding.

Usually the suction hose 56 will at first be left hanging down into the mold 20 near the entrance opening, while the blast hose 54 is used to clean the lower half 20 of the mold first. Much of the abrasive will be drawn out the suction hose 56 even at this time, and if any particular part of the mold 20 becomes covered by an excessive amount of material, the suction hose 56 may be brought over and used to clean out that part. After the lower half 20 of the mold is clean, the upper half 21 may be similarly cleaned, most of the abrasive falling down into the lower half 20.

It may be mentioned here that the preferred abrasive is a soft abrasive similar to walnut shells broken up into fairly small pieces. This gives sufficient abrasive action without any grinding action and also provides an oil which has a good effect on the surface of the tire mold in preventing the rubber from sticking.

After the mold has been thoroughly cleaned, the blast current may be turned off. The blast hose 54 may then be withdrawn to a point near or even outside the entrance opening 53. The suction hose 56 may then be manipulated around to remove substantially all of the abrasive from the crevices of both sections of the mold. The suction current may then be turned off and both hoses 54 and 56 removed. Then the valve 45 may be turned so as to bleed the air from the lower end 47 of the air cylinders 41. The diaphragm 35 collapses and the shield 30 and its associated parts may then be lifted off the lower tire mold 20 and transferred to the next mold that is to be cleaned. Then the suction hose 56 may then be used once more to go over the entire mold and pick up any stray particles of abrasive.

What is claimed is:

1. An apparatus for treating the interior surfaces of plural piece molds, comprising a peripheral shield open at each end surrounding the space between the mold sections and fitting snugly against said sections so that said sections and said shield enclose a volume whose interior surface includes the mold surface to be treated, said shield being provided with a transparent window; a blast conduit passing through the walls of said shield; a suction conduit passing through the walls of said shield; and flexible arm-protecting means in the wall of said shield with the aid of which the hand of an operator may be used to manipulate said conduits inside said shield.

2. An apparatus for treating the interior surfaces of plural piece molds, comprising a peripheral transparent, substantially imperforate shield surrounding the space between the mold sections and fitting snugly against them so as to enclose a volume whose interior surface includes the mold surface to be treated, said shield being provided with an air-intake opening; a blast conduit passing through the walls of said shield; a suction conduit passing through the walls of said shield; and flexible arm-protecting means in the wall of said shield, with the aid of which the hand of an operator may be used to manipulate said conduits inside said shield.

3. An apparatus for treating the interior surfaces of plural piece molds, and preventing the treating material from flying about, comprising a substantially imperforate peripheral shield surrounding the space between the mold sections and fitting snugly against the sections adjacent their outer edges so as to enclose a volume whose interior surface includes the mold surface to be treated, a portion of said shield comprising a transparent window; a blast conduit passing through the walls of said shield; a suction conduit, passing through the walls of said shield; and flexible means fitted in openings through the wall of said shield, by which the hand of an operator may be used to manipulate said conduits inside said shield while protecting his arm and preventing the passage of the treating material therethrough.

4. An apparatus for treating the interior surfaces of plural piece molds, and preventing the treating material from flying about while giving the operator substantially complete visibility of the mold interior, comprising a substantially imperforate largely-transparent, peripheral shield open at each end and surrounding the space between the mold sections and fitting snugly against them adjacent their outer edges so as to enclose a volume whose interior surface includes the mold surface to be treated; a blast conduit adapted to fit slidably in an opening through the walls of said shield; a suction conduit, adapted to fit slidably in an opening through the walls of said shield; and flexible means fitted in openings through the wall of said shield, by which the hand of an operator may be used to manipulate said conduits inside said shield, while protecting his arm and preventing the passage of the treating material therethrough.

5. An apparatus for treating the interior surfaces of plural section molds, comprising a transparent, substantially imperforate peripheral shield open at each end and adapted to surround the space between the mold sections and fitting snugly against them so as to enclose a volume within said sections and shield, part of the interior surface of the volume being the mold surface to be treated, said shield having two slip joint openings, one air-admitting opening, and at least one arm-hole opening therethrough; and a flexible member substantially closing each arm hole opening in said shield, whereby the hand of an operator may be used to manipulate said conduits inside said shield.

6. An apparatus for treating the interior surfaces of plural piece molds, comprising a transparent, substantially imperforate peripheral shield open at each end and adapted to surround the space between the mold sections, said shield having two slip joint openings, one air-admitting opening, and at least one arm opening therethrough; gasket means along the upper and lower edges of said shield, for seating said shield against the respective mold halves so that said shield and said halves enclose a volume that includes the surface to be treated as part of its inner surface; a blast conduit passing slidably through one said slip-joint openings; a suction conduit passing slidably through the other said slip-joint opening; and a flexible member substantially closing each arm hole opening, whereby the hand of an operator may be used to manipulate said conduits inside said shield.

7. An apparatus for treating the interior surfaces of plural piece molds, comprising a substantially imperforate peripheral shield surrounding the space between the mold sections, a portion thereof being transparent, said shield having two slip joint openings, one air-admitting opening, and at least one arm-hole opening therethrough; a flexible diaphragm secured along the upper open edge of said shield; gasket means along the lower edges of said shield, for seating said shield against the lower mold half; gasket means secured along the upper edge of said diaphragm for sealing against the upper mold half; means to force said diaphragm upwardly to seat the upper gasket against its mold half so that said halves and said shield enclose a volume whose inner surface includes the areas of both halves that are to be treated; a blast conduit adapted to fit slidably in one of said slip-joint openings; a suction conduit adapted to fit slidably in the other said slip-joint opening; and a flexible member substantially closing each arm hole opening in said shield, whereby the hand of an operator may be used to manipulate said conduits inside said shield.

8. The device of claim 7 in which the means to force said diaphragm upwardly comprise hydraulic cylinders and associated pistons pivotally mounted between said upper and lower gaskets.

9. An apparatus for treating the interior surfaces of plural piece molds, comprising a substantially imperforate peripheral shield surrounding the space between the mold sections, a portion thereof being transparent, said shield having two slip joint openings, air admitting means, and at least one arm opening therethrough; a generally annular rigid lower rim member, secured to the lower edge of said shield; a flexible diaphragm secured along the upper open edge of said shield; a generally annular upper rigid rim member secured to the upper edge of said diaphragm; gasket means secured to said upper and lower rim members; means to force said diaphragm upwardly to seat the upper gasket against its mold half said halves and said shield then enclosing an isolated volume on whose inner surfaces lie the areas to be treated in both halves; a blast conduit adapted to fit slidably in one of said slip-joint openings; a suction conduit adapted to fit slidably in the other said slip-joint opening; and a flexible member substantially closing each arm opening in said shield, whereby the hand of an operator may be used to manipulate said conduits inside said shield.

10. The device of claim 9 in which said upper-gasket seating means comprises a pair of hydraulic cylinders secured pivotally in each side of said lower rim member, with their piston rods extending out of said cylinders and pivotally secured to the upper rim member.

11. The apparatus of claim 10 in which there are lighting means secured to the interior of said shield for illuminating the space inside the shield.

12. An apparatus for treating the interior shape-imparting surfaces of plural piece molds, including in combination a peripheral shield open at each end and adapted to surround the space between at least two mold sections and cooperating with said mold sections to enclose a volume, part of whose interior surface comprises the surfaces to be cleaned in both said sections, said shield being provided with a transparent window; a blast conduit passing through the walls of said shield; and a suction conduit passing through the walls of said shield, said conduits both being manipulatable for directing their respective outlet and inlet toward all portions of the surfaces of both mold sections.

13. An apparatus for treating the interior surfaces of two-piece molds, including in combination a substantially imperforate peripheral shield open at its upper and lower edges and adapted to surround the space between the two mold sections, a portion thereof being transparent; gasket means along the lower open edge of said shield for snug engagement with the rim of the lower mold half; flexible diaphragm means secured along the upper open edge of said shield; generally annular rigid gasket means secured to said diaphragm means and adapted for snug engagement with the rim of the upper mold half, so that said shield and said mold halves then enclose a volume, the surfaces to be treated being part of the inner surface of said volume; means to force said diaphragm upwardly to seat said gasket means against the upper mold half; and blast and suction conduits passing through the walls of said shield.

14. The device of claim 13 in which the means to force the diaphragm upwardly comprises hydraulic cylinders and associated pistons pivotally mounted between said upper and lower gasket means.

15. An apparatus for treating the interior surfaces of plural-piece molds, comprising a substantially imperforate peripheral shield open at both its upper and lower ends and adapted to surround the space between the mold sections so that said sections and said shield may surround and isolate a volume including the surface to be treated, a portion thereof being transparent, said shield having openings through which blast and suction conduits may be passed; gasket means along the lower edge of said shield, for seating said shield against the lower mold half; a flexible diaphragm secured along the upper edge of said shield; gasket means secured along the upper edge of said diaphragm for sealing against the upper mold half; and means to force said diaphragm upwardly to seat the upper gasket against its mold half.

16. The device of claim 15 in which the means to force said diaphragm upwardly comprise hydraulic cylinders and associated pistons pivotally mounted between said upper and lower gaskets.

17. An apparatus for treating the interior surfaces of plural molds, comprising a substantially imperforate peripheral shield open at both ends and surrounding the space between the mold sections, a portion of said shield being transparent, said shield having means for receiving conduits for conveying treating material into and out of the volume enclosed by said shield and the mold sections; a generally annular rigid lower rim member, secured to the lower edge of said shield; a flexible diaphragm secured along the upper edge of said shield; a generally annular rigid upper rim member secured to the upper edge of said diaphragm; gasket means secured to said upper and lower rim members; and means to force said diaphragm upwardly to seat the upper gasket against its mold half.

18. The device of claim 17 in which said upper gasket seating means comprises a pair of hydraulic cylinders secured pivotally in each side of said lower rim member, with their piston rods extending out of said cylinders and pivotally secured to the upper rim member.

19. The apparatus of claim 17 in which there are lighting means secured to the interior of said shield for illuminating the space inside the shield.

DALE C. JOHNSON.
HARRY L. WARNER.
ARTHUR A. ZAMBRUNO.

REFERENCES CITED

The following references are of record in the file of this patent:

UNITED STATES PATENTS

| Number | Name | Date |
|---|---|---|
| 1,977,386 | Holes | Oct. 16, 1934 |
| 2,321,774 | Ruemelin | June 15, 1943 |
| 2,479,299 | Biggs et al. | Aug. 16, 1949 |

FOREIGN PATENTS

| Number | Country | Date |
|---|---|---|
| 119,012 | Australia | Sept. 25, 1944 |